Dec. 22, 1970     C. A. MOUNTEER     3,548,613

FLEXURE PIVOT ASSEMBLY AND METHOD OF FABRICATION

Filed Jan. 16, 1969     3 Sheets-Sheet 1

INVENTOR.
CARLYLE A. MOUNTEER
BY
ATTORNEYS

Dec. 22, 1970   C. A. MOUNTEER   3,548,613
FLEXURE PIVOT ASSEMBLY AND METHOD OF FABRICATION
Filed Jan. 16, 1969   3 Sheets-Sheet 2
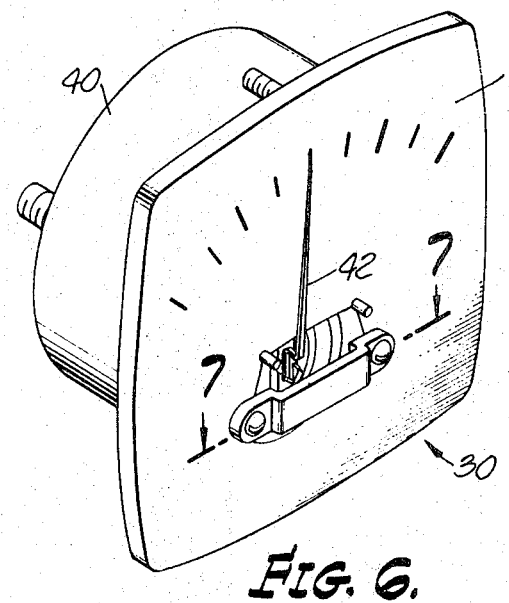
FIG. 6.
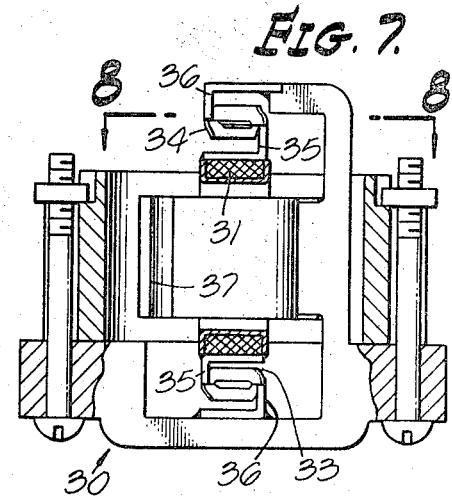
FIG. 7.
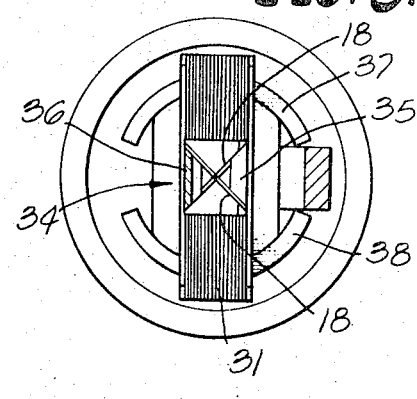
FIG. 8.
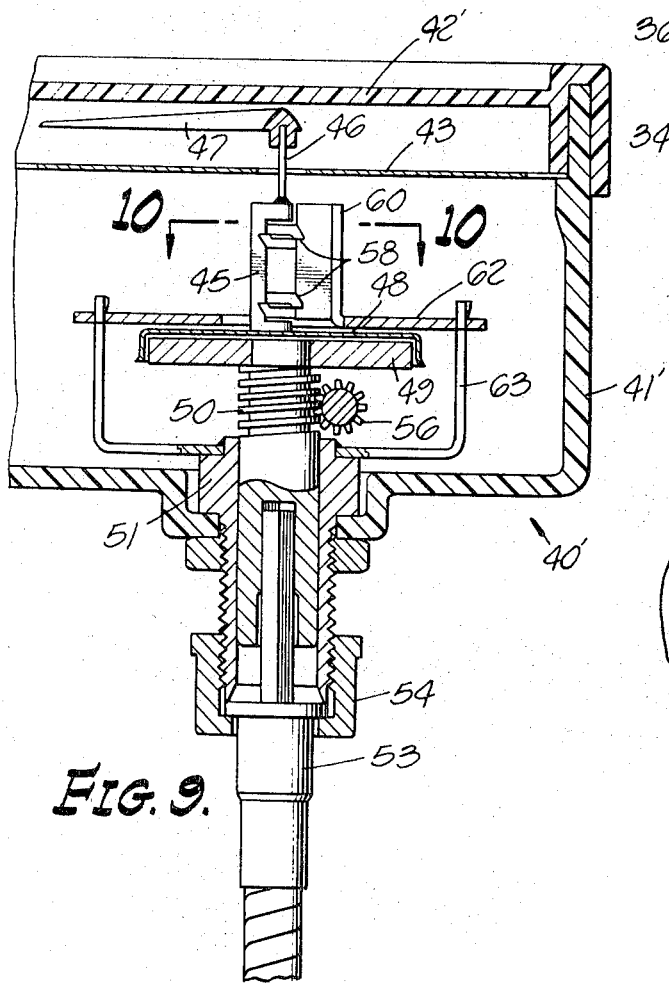
FIG. 9.
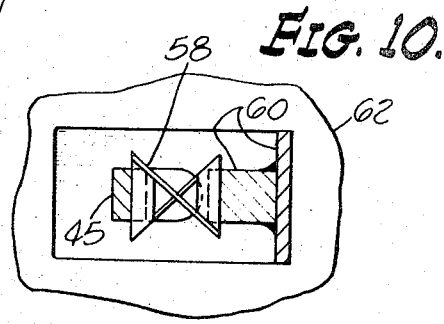
FIG. 10.
INVENTOR.
CARLYLE A. MOUNTEER
BY
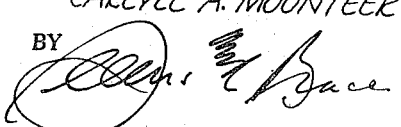
ATTORNEYS

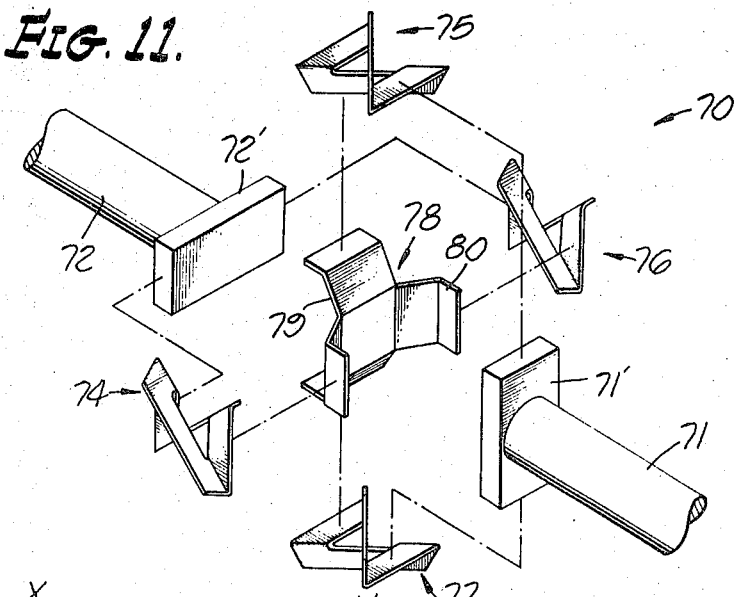
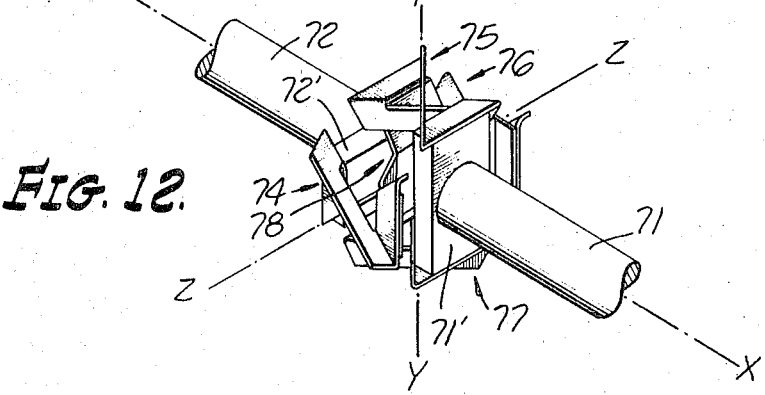
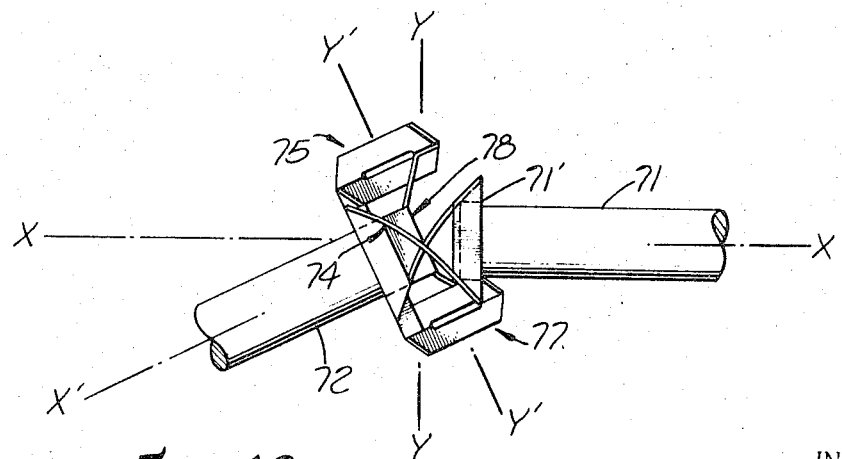

United States Patent Office 3,548,613
Patented Dec. 22, 1970

3,548,613
FLEXURE PIVOT ASSEMBLY AND
METHOD OF FABRICATION
Carlyle A. Mounteer, 1250 Sierra Madre Villa,
Pasadena, Calif. 91107
Filed Jan. 16, 1969, Ser. No. 791,639
Int. Cl. F16d 3/56
U.S. Cl. 64—15                                26 Claims

ABSTRACT OF THE DISCLOSURE

A flexure pivot assembly and method of fabricating the same from sheet spring stock, the assembled unit being formed from a pair of separate or integral right triangular rings split diagonally of their right angle apex and having their hypotenuses lying in crossing planes perpendicular to their legs. The triangular rings are held assembled back to back with the hypotenuses projecting away from a common intervening plane. This frictionless flexure pivot assembly has many uses including small arc pivots and journals, as a flexible connector between relatively moving instrument components, universal joints, torque-transmitting couplings, etc. Miniature embodiments can be manufactured inexpensively in mass quantities by photo-etching blanking from sheet stock, and larger sizes can be blanked by punching or the like. The securely connected legs at the opposite ends of the assemblies provide stable mounting webs integral with the flexure members proper.

---

This invention relates to frictionless bearings and more particularly to a Cardan flexure pivot assembly of novel construction adapted to be made inexpensively in subminiature form and having unique properties and characteristics including the ability to transmit torsional loads.

A wide variety of proposals have been made heretofore for the construction and assembly of Cardan pivots for their unusual low friction pivot characteristics. However, all are subject to one or more shortcomings and disadvantages including in particular their high cost, assembly problems, objectionable mass and weight, and size limitations, particularly in smaller dimensions. Certain of the prior art constructions are machined or otherwise formed from high quality solid stock at considerable cost in material, time and labor. The weight and mass of the mounting support for the springs proper has also presented serious problems heretofore, particularly in applications where weight and bulk must be held to a bare minimum.

It is accordingly a primary objective of the present invention to provide a greatly improved frictionless pivot assembly avoiding the foregoing and other shortcomings of prior constructions. To this end there is provided by this invention a simple, rugged, extremely light, high-efficiency flexure pivot assembly readily and inexpensively manufactured from sheet spring stock. In a preferred embodiment, the entire pivot assembly is formed from a single blank of sheet stock folded to provide a pair of crisscrossed, highly resilient flexure members interconnected crosswise of their opposite ends by a dual thickness of the sheet material and serving additionally as means for securing the pivot to members of its operating environment. Basically, the structure comprises a pair of right triangular rings split diagonally of the juncture between its two legs. These legs are bent in the opposite directions to lie perpendicular to the hypotenuse along a fold axis aligned with the inner edge thereof. The legs of a pair of these triangles are rigidly secured together to provide a complete Cardan pivot assembly suitable for use in a wide variety of applications. The triangular rings may be formed separately or as a single unit comprising a pair of similar right triangular rings integral along one pair of leg edges. If the rings are integral, their joined legs are folded through 180 degrees along the junction line to lie flush against one another and with their respective hypotenuses crossing one another.

In smaller sizes, the flexure component is blanked from sheet stock in mass quantities using photo-etching techniques. Large numbers of the components are thereby formed quickly and inexpensively, following which the individual blanks are folded into a desired shape ready for mounting in a wide variety of operating embodiments.

It is therefore a primary object of this invention to provide an improved, unitary flexure pivot assembly and a method of fabricating the same.

Another object of the invention is the provision of a one-piece flexure pivot assembly blanked from sheet stock to provide a pair of split right triangular rings and folded so that their hypotenuses form flexure members supported and interconnected by a respective leg of each triangular ring.

Another object of the invention is the provision of a coupling between a pair of misaligned shafts interconnected between their adjacent ends by means including a plurality of flexure pivot assemblies.

Another object of the invention is the provision of a universal joint assembly formed by a plurality of flexure pivot assemblies.

Another object of the invention is the provision of an improved instrument, as a speedometer, having a pivoting indicator supported by a plurality of flexure pivot assemblies and connected to the driven end of a rotary magnetic coupling.

Another object of the invention is the provision of an improved method of folding a blank formed from sheet spring material or stock into a flexure pivot assembly all portions of which are formed from the sheet stock.

These and other more specific objects will appear upon reading the following specification and claims and upon considering in connection therewith the attached drawings to which they relate.

Referring now to the drawings in which preferred embodiments of the invention are illustrated.

FIG. 6 is a perspective view of a galvanometer instrument having its movable indicator supported by the invention flexure pivot assembly;

FIG. 7 is a fragmentary view partly in section taken along line 7—7 on FIG. 6;

FIG. 8 is a cross-sectional view taken along line 8—8 on FIG. 7;

FIG. 9 is a cross-sectional view through a speedometer showing the indicator needle thereof supported on a pair of the invention flexure pivot assemblies;

FIG. 10 is a cross-sectional view on an enlarged scale taken along line 10—10 on FIG. 9;

FIG. 11 is an exploded isometric view of a universal coupling formed by a plurality of flexure pivot elements according to this invention;

FIG. 12 is an isometric view of a coupling fully assembled and indicating the XYZ axes thereof; and FIG. 13 is a side elevational view of FIG. 12 showing the two shafts misaligned.

Figure 1:
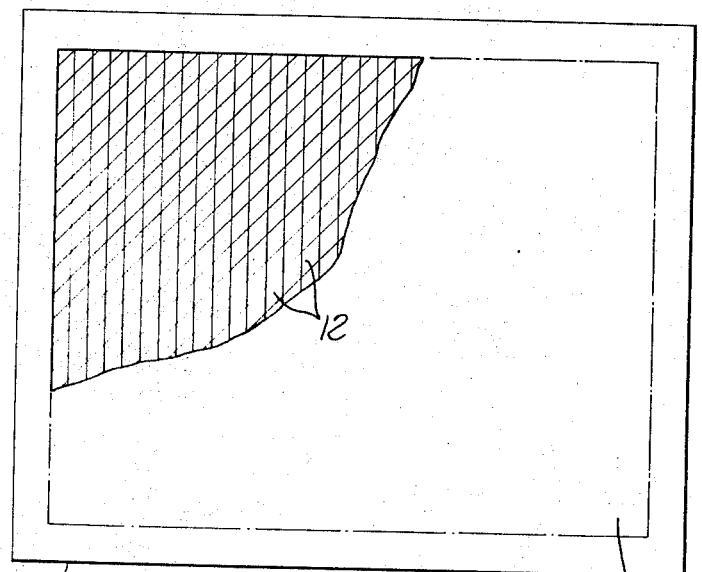
FIG. 1 is a diagrammatic top plan view indicating generally the photo-etching of a plurality of flexure pivot assemblies in accordance with the principles of this invention.
Figure 2:
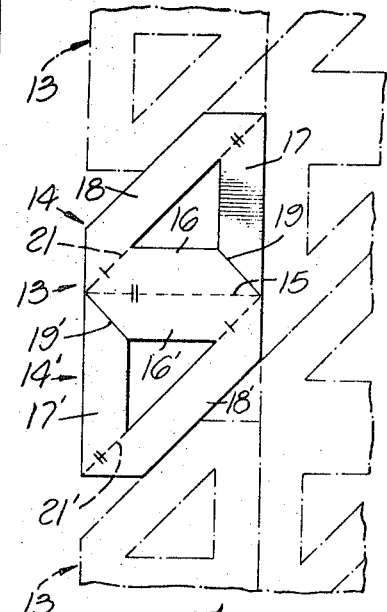
FIG. 2 is a fragmentary view on an enlarged scale showing a plurality of flexure pivot blanks as produced from a sheet of spring stock by photo-etching.

Referring initially and more particularly to FIGS. 1 through 5, there is shown a frame 10 in which is supported a sheet 11 of suitable highly resilient sheet material obeying Hook's Law as, for example, beryllium copper, stainless steel, or other highly resilient metal. If the sheet is to be blanked by photo-etching technique, the thickness usually ranges between ½ to 10 mils depending upon the size and load characteristics desired in the finished flexure pivot component. Greater thicknesses are preferably blanked by stamping or other appropriate mode. The upper lefthand corner of sheet 11 is shown cross-checked in a diamond configuration as indicated at 12, 12 to represent a single unitary blank 13 having the configuration indicated in solid lines in FIG. 2.

Each of these blanks 13 may be viewed as comprising identical right triangular rings 14, 14' integral with one another along the dotted line 15. The expression "triangular rings" has been adopted for convenience, it being understood that a right triangle is blanked out of the center of each of the identical right triangles 14, 14'. Each half of the blank is therefore herein designated a right triangular ring and comprises legs 16, 17 interconnected between their outer ends by the hypotenuse 18. In photo-etching or otherwise blanking each of the triangular rings, the right angle between legs 16 and 17 is slit or severed along a 45 degree diagonal, as is indicated at 19, 19'. It will be understood that the same reference characters distinguished by a prime are used to indicate the same feature of the respective halves 14, 14' of double triangular ring unit 13. Each of the legs 16, 17 and the hypotenuse 18, as herein shown, are substantially the same width but this relationship is not essential, nor need the legs be of the same length, nor need the hypotenuses be at any particular angle relative to one another.

Figure 3:
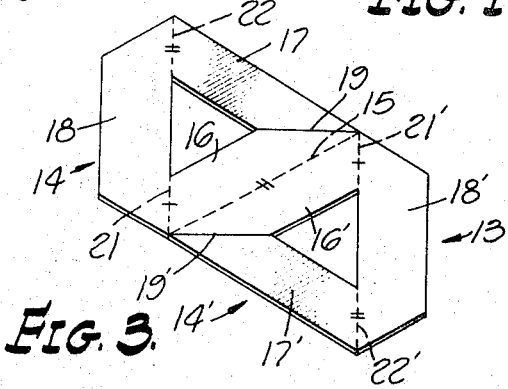
FIG. 3 is a perspective view of a single blank comprising two attached triangular rings and indicating the direction and location of folds made in forming the blank into a pivot assembly.
Figure 4:
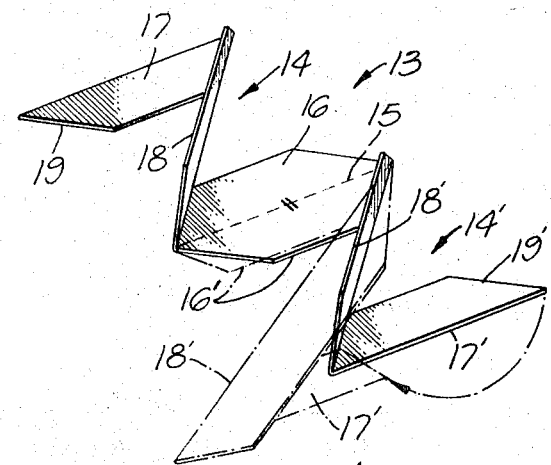
FIG. 4 is a perspective view of the FIG. 3 blank in the process of being folded.
Figure 5:
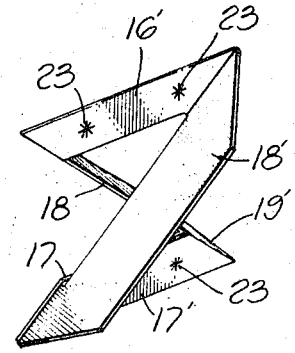
FIG. 5 is a perspective view of the pivot assembly fully assembled.

One of the preferred modes of folding blank 13 into the final product shown in FIG. 5 is illustrated in FIGS. 3 to 5. Although the forming operation may proceed in various ways, a particularly simple and expeditious mode comprises folding the hypotenuses 18, 18' toward one another, as viewed in FIG. 3, along the fold lines 21, 21', these lines lying parallel to one another and coextensive with the inner edge of the respective hypotenuses until each hypotenuse lies normal to legs 16, 16'. For convenience, all fold lines are indicated in dotted line with either one or two short lines across their midportions. A single line indicates a fold in one direction, and a double line a fold in the opposite direction. Legs 17, 17' are also similarly folded through 90 degrees along lines 22, 22' so as to lie in a common plane parallel to one another and to legs 16, 16', as is clearly shown in FIG. 4. Completing the forming operation involves folding triangular rings 14, 14' along line 15 coextensive with the adjacent edges of legs 16, 16', and in a direction to place the hypotenuses on the opposite sides thereof. Leg pairs 16, 16' and 17, 17' will then lie flush against one another with the two hypotenuses 18, 18' normal to all legs but on the opposite sides of these legs. Both pairs of legs are preferably rigidly secured together as by spot welding 23, 23.

Referring now to FIGS. 6 to 8, there is shown a typical instrument, such as a galvanometer 30, having its movable element or coil 31 supported on a pair of the invention flexure pivots 33, 34. The axially opposed ends of coil 31 are provided with brackets 35 to which the mounting legs across one end of the associated flexure pivot 33, 34 is secured, as by brazing. The corresponding mounting legs across the other end of each flexure pivot assembly is similarly secured to mounting brackets 36 carried by the main frame of the instrument and to which the permanent magnets 37, 38 are secured. The entire assembly is mounted in a suitable housing 40 equipped with a calibrated dial 41. A slender indicating needle 42 is securely attached to one end of movable element 31 and pivots through a short arc about the aligned axes of flexure pivots 33, 34.

As will be apparent from the foregoing description of galvanometer 30, all moving components are supported by the two flexure pivot assemblies 33, 34 with indicator 42 normally in its neutral or null position as shown in FIG. 8. If current of one polarity is supplied to the terminals of coil 31, the indicator deflects in one clockwise direction; whereas if current of the opposite polarity is supplied to the coil, the indicator pivots in the opposite direction and by an amount dependent upon the applied voltage. In either case, the movement is resisted by the two pairs of crisscrossed legs 18, 18' of the respective flexure pivot assemblies 33, 34. The opposite ends of the two flexure legs 18, 18' are rigidly supported by their respective mounting brackets 35, 36 and all movable components are firmly but highly resiliently supported by the frictionless flexure units 33, 34.

Referring now to FIGS. 9 and 10, there is shown a second illustrative operating embodiment comprising a speedometer 40' enclosed within a housing 41' having a transparent window 42 of plastic or the like material providing a protective cover for the calibrated scale imprinted on dial 43. The lightweight movable components of the assembly include a yoke 45 to which a shaft 46 and an indicator needle 47 are firmly secured with the free end of needle 47 disposed to move over the calibrated scale. Yoke 45 is secured coaxially of a shallow metallic cup 48 in close proximity to and embracing the opposite ends of a permanent magnet driver 49 secured crosswise of the inner end of a worm shaft 50 journaled for rotation within a bearing 51 projecting through the wall of housing 41.

The end of a conventional speedometer flexible shaft assembly 53 is held coupled by coupling 54 to worm shaft 50 which drives a worm gear 56 which may be connected to the usual odometer, not shown. The magnetically driven cup-shaped member 48, together with the attached yoke 45 and indicator 47, is supported entirely by a pair of identical flexure pivots 58, 58 having one pair of supporting legs brazed or otherwise secured to yoke 45 and their other pair of supporting legs similarly rigidly secured to support bracket 60 struck upwardly from the center portion of a strip 62. The opposite ends of this latter strip are staked or otherwise secured in a mounting strap 63 anchored to bearing 51 for shaft 50.

The details of the support for flexure pivots 58 are best shown in FIG. 10. Thus, the overlapping legs at one end of flexure pivot 58 are seated in a slot formed in yoke 45 and brazed thereto whereas the legs at the other end of the flexure pivot are similarly supported in bracket 60 struck upwardly from the center of strip 62.

Speedometer 40 operates in a generally conventional manner, it being understood that the rotary portion of shaft assembly 53 is telescoped into the end of worm shaft 50 and rotates permanent magnet 45 in accordance with the rate of travel of the vehicle on which it is mounted. Rotation of magnet 45 produces a drag effect on cup 48 and this tendency to rotate the cup is resisted by the two flexure pivot assemblies 58, 58. As the rotation of the magnet varies so does the effective strength of the drag effect on cup 48 thereby varying the torque applied to yoke 45 which is resisted by the aligned pair of flexure pivots 58. When the driven shaft ceases to rotate, the flexure pivots return the indicator needle 47 to its neutral position. The assembly is highly resistant to shock, vibration and sudden changes in the applied load. Additionally, the bearing for the movable components requires no lubrication initially or at any time during its service life and the bearings so provided are not subject to frictional wear.

Referring now to FIGS. 11 through 13, there is shown another illustrative embodiment utilizing the invention flexure pivot assembly as part of a coupling and more specifically as a load-transmitting universal joint designated generally 70. This universal coupling interconnects a pair of shafts 71, 72 shown in axial alignment in FIGS. 13 and 14 and in severe misalignment in FIG. 15. Each of the shafts is shown as having a cross arm 71', 72', fixed thereto but rotated to lie 90 degrees out of phase. The coupling employs four identical flexure pivot units 74, 75, 76, 77 of the same type described above. A final component of the assembly comprises a stirrup unit 78 comprising a pair of oppositely facing yokes 79, 80 rotated to lie 90 degrees to one another about a common center.

The components just described are rigidly secured together in the manner indicated in exploded condition in FIG. 13. The points to which each pair of mounting legs of the respective flexure pivots 74 to 77 is secured are indicated in the dot-and-dash lines. For example, the left-hand pair of mounting legs of pivot 74 is secured to the left-hand end of cross bar 72' whereas the other pair of mounting legs for this pivot assembly is secured to the adjacent ends of yoke 80. The corresponding mounting legs of flexure pivot 76 are secured to the opposite ends of cross bar 72' and yoke 80. The opposite ends of flexure pivots 75, 77 are secured by brazing, welding, or otherwise between the ends of yoke 79 and cross bar 71' of shaft 71.

The operation of the coupling will be readily apparent from the foregoing description and from a consideration of FIGS. 12 and 13. It will be observed that the three pivot axes are there represented by the dot-and-dash lines X, Y and Z. If the shafts are in alignment, then there is a common axis X whereas if the shafts are misaligned, then the axes are represented by X, X' and the modified Y axis is indicated at Y, Y'. The crisscrossing flexible strips of each flexure pivot readily accommodate misalignment. Additionally and importantly, one strip of each flexure pivot lies roughly at an angle of 45 degrees to the axis of the shaft and is loaded in tension. Accordingly, this strip is highly effective to transmit light torsional loads from one shaft to the other. There are therefore four strip members available and mutually cooperating to transmit torsional loads irrespective of the direction in which the driver shaft is rotating.

While the particular flexure pivot assembly and method of fabrication herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. A flexure pivot unit formed of thin highly-resilient stock and including a pair of crisscross legs positively interconnected crosswise of their remote ends by integral mounting strips lying in a generally common plane and at right angles to the plane of the said crisscross legs.

2. A flexure pivot unit as defined in claim 1 characterized in that said mounting strips are parallel to one another.

3. A flexure pivot unit as defined in claim 1 characterized in that said mounting legs lie in a plane generally contiguous to the adjacent inner edges of said crisscross legs.

4. A flexure pivot unit as defined in claim 1 characterized in that said unit is formed in one piece from sheet stock.

5. A flexure pivot unit as defined in claim 1 characterized in that said mounting legs each include a plurality of legs in closely spaced parallel relationship.

6. A flexure pivot unit as defined in claim 5 characterized in that the plurality of legs in each mounting leg are rigidly interconnected between the opposite ends thereof.

7. A flexure pivot unit as defined in claim 6 characterized in that one pair of said mounting legs are integral with one another along one contiguous pair of lateral edges.

8. A flexure pivot formed from resilient sheet material comprising a pair of similar right-triangular rings having first and second legs at right angles and interconnected by a respective third leg, said triangular rings being superimposed with their second legs crossing in opposite directions, said third legs being bent away from one another to lie at right angles to a plane passing between said superimposed triangular rings, and said second legs being severed from said first legs and bent to lie in closely overlapping parallel relationship, and means securing said overlapped second legs rigidly together.

9. A flexure pivot as defined in claim 8 characterized in that said first legs of said triangular rings are integral with one another along the adjacent outer edges thereof, and said first legs being folded along said integral edges to lie flush against one another.

10. A flexure pivot as defined in claim 8 characterized in the provision of means securing said first legs rigidly together.

11. A flexure pivot as defined in claim 8 characterized in that said triangular rings are formed as a unit from a common homogeneous sheet of resilient stock.

12. A flexure pivot as defined in claim 8 characterized in that said second legs are spot welded to one another at points spaced along the length thereof.

13. A flexure pivot as defined in claim 8 including a plurality of said pivots having a first end of each rigidly secured to a stationary member, with the crisscrossed legs of said pivots lying in aligned spaced apart parallel relation, torque responsive means interconnecting the second end of each of said pivots together and including means for imparting a torque force thereto in a direction normal to the common flex axis of said pivots, and means carried by said torque-responsive means for indicating torqueing movement thereof.

14. A flexure pivot as defined in claim 13 characterized in that said torque-indicating means comprises a slender pointer having one end fixed to said torque-responsive means and projecting generally radially from the axis of said flexure pivots.

15. A flexure pivot as defined in claim 13 characterized in that said torque-imparting means includes permanent magnet means supported for rotation on an axis aligned generally with the axis of said flexure pivots and operatively associated with said torque-responsive means.

16. A flexure pivot as defined in claim 13 characterized in that said torque-responsive means and torque-indicating means are supported substantially entirely by and on said spaced-apart flexure pivots.

17. A flexure pivot as defined in claim 13 characterized in that said torque indicating means includes graduated scale means closed spaced from the outer end thereof.

18. A flexure pivot as defined in claim 8 including a plurality of said pivots arranged to provide to a torque-transmitting connection between the adjacent ends of a pair of generally aligned rotatably supported shafts, said pivots being arranged in aligned pairs with the flexure axis of one pair lying at 90 degrees to the flexure axis of the other pair, the mounting strips of one pair being rigidly secured to the opposite sides of one shaft end and the remote mounting strips of the other pair of pivots being rigidly secured to the opposite sides of the other shaft end, and rigid means interconnecting the other ends of both pairs of flexure pivots.

19. A flexure pivot as defined in claim 18 characterized in that said last mentioned means comprises rigid means having two pairs of legs projecting in opposite directions from a common connecting member.

20. A flexure pivot as defined in claim 18 characterized in that said last mentioned means comprises a plate having pairs of legs parallel to one another and projecting in opposite directions from the central portion thereof.

21. A flexure pivot as defined in claim 18 characterized in that the flexure axes of the aligned pairs of flexure pivots intersect one another closely adjacent the intersection of the misaligned axes of said shafts.

22. A flexure pivot as defined in claim 21 characterized in that said flexure pivots each include crisscrossed strips each inclined in opposite directions relative to the axes of said shafts, one crisscrossed strip of each pivot being placed in longitudinal tension by a clockwise torque force applied to the driven shaft and the other crisscrossed strip of each pivot being placed in longitudinal tension by a counterclockwise torque force applied to said driven shaft.

23. A universal joint assembly for use in coupling two slightly misaligned shafts, said assembly comprising two pairs of flexure pivots arranged in pairs spaced 90 degrees apart about the space between the adjacent ends of the misaligned shaft ends with the pivot axis of each pair generally intersecting closely adjacent the intersection of the shaft axes, means for connecting the ends of one pair of pivots to a respective shaft end, and means rigidly interconnecting the other ends of both pairs of pivots.

24. That method of fabricating a flexure pivot assembly from sheet spring stock which comprises: blanking a pair of right triangular rings split diagonally of their right angle corners, folding the legs of each triangular ring 90 degrees in opposite directions along lines contiguous to the inner edges of their respective hypotenuses with said legs lying parallel and in a common plane, bringing the parallel legs of said pair of triangular rings together with their hypotenuses crossing and their inner edges in close proximity and parallel to a common intervening plane, and securing the adjacent pairs of legs together to complete the fabrication of the assembly.

25. That method of fabrication as defined in claim 24 characterized in that said blanking step is performed in such manner that said triangular rings are integral along the edges of one pair of legs with the other leg of each spaced remotely from and lying parallel to one another, folding said hypotenuses to lie parallel and perpendicular to the same side of a plane flush with their respective inner edges, and folding said triangular rings through 180 degrees along the integral edges of said one pair of legs and in a direction to bring the inner edges of said hypotenuses closely together before securing the other pair of legs rigidly together.

26. That method of fabricating a flexure pivot assembly from sheet spring stock which comprises: blanking a pair of right triangular rings from said stock and split diagonally of the right angle apex of each, oppositely creasing the junction of the legs of each along a line contiguous with the inner edge of each hypotenuse while folding the legs of each triangular ring in opposite directions to lie parallel in a plane perpendicular to the inner edge of the associated hypotenuse, and securing the legs of each of said triangular rings together with their hypotenuses crossing and projecting perpendicularly away from the opposite faces of a common intervening plane.

References Cited

UNITED STATES PATENTS

| | | | |
|---|---|---|---|
| 1,025,875 | 5/1912 | Lambert | 64—12 |
| 1,406,361 | 2/1922 | Forsyth | 64—12 |
| 1,450,350 | 4/1923 | Bell | 64—13 |
| 2,721,457 | 10/1955 | Moore | 64—15 |
| 3,481,158 | 12/1969 | Mayerjak | 64—12 |

JAMES A. WONG, Primary Examiner

U.S. Cl. X.R.

29—11; 64—27